United States Patent [19]

Smith et al.

[11] Patent Number: 4,972,017

[45] Date of Patent: Nov. 20, 1990

[54] RINSE SOLUBLE POLYMER FILM COMPOSITION FOR WASH ADDITIVES

[75] Inventors: William L. Smith, Pleasanton; Edward J. Kaufmann, San Ramon; Barry A. Sudbury, Pleasanton, all of Calif.

[73] Assignee: The Clorox Company, Oakland, Calif.

[21] Appl. No.: 269,927

[22] Filed: Nov. 10, 1988

Related U.S. Application Data

[62] Division of Ser. No. 30,196, Mar. 24, 1987, Pat. No. 4,801,636.

[51] Int. Cl.[5] .................................................. C08L 3/00

[52] U.S. Cl. .................................. 524/46; 252/174.13; 524/557

[58] Field of Search ........................ 524/35, 43, 44, 46, 524/557; 428/507, 913; 525/56, 61; 252/90, 91, 174.13

[56] References Cited

U.S. PATENT DOCUMENTS

| | | | |
|---|---|---|---|
| 2,554,850 | 5/1951 | Binda | 88/65 |
| 3,113,674 | 12/1963 | Kiefer et al. | 206/84 |
| 3,198,740 | 8/1965 | Dunlop, Jr. et al. | 252/90 |
| 3,528,921 | 9/1980 | Gray | 252/99 |
| 3,534,851 | 10/1970 | Peterson et al. | 206/0.5 |
| 3,850,901 | 11/1974 | Tanaka et al. | 260/91.3 |
| 3,892,905 | 7/1975 | Albert | 428/220 |
| 4,082,678 | 4/1978 | Pracht et al. | 252/8.6 |
| 4,098,969 | 7/1978 | Zimmerman et al. | 526/9 |
| 4,108,600 | 8/1978 | Wong | 8/137 |
| 4,115,292 | 9/1978 | Richardson et al. | 252/90 |
| 4,176,079 | 11/1979 | Guerry et al. | 252/90 |
| 4,188,304 | 2/1980 | Clarke et al. | 252/93 |
| 4,234,442 | 11/1980 | Cornelissens | 252/90 |
| 4,289,815 | 9/1981 | Lee | 428/35 |
| 4,323,492 | 4/1982 | Zimmermann et al. | 524/388 |
| 4,348,293 | 9/1982 | Clarke et al. | 252/90 |
| 4,416,791 | 11/1983 | Haq | 252/90 |
| 4,557,852 | 12/1986 | Schultz et al. | 252/95 |
| 4,626,372 | 12/1986 | Kaufmann et al. | 252/90 |
| 4,765,916 | 8/1988 | Ogar, Jr. et al. | 252/8.9 |

FOREIGN PATENT DOCUMENTS

| | | |
|---|---|---|
| 1100260 | 5/1981 | Canada . |
| 0079712 | 5/1983 | European Pat. Off. . |
| 4137047 | 10/1979 | Japan . |
| 2090603 | 7/1982 | United Kingdom . |

*Primary Examiner*—Morton Foelak
*Assistant Examiner*—Kathryne Shelborne
*Attorney, Agent, or Firm*—Michael J. Mazza; Joel J. Hayashida; Stephen M. Westbrook

[57] ABSTRACT

A polymeric film material for the rinse release of wash additives comprises a blend of polyvinyl alcohol and an alkyl cellulose. A metalloid oxide cross-linking agent is present in an amount sufficient to sharply reduce the solubility rate of the film blend in an alkaline wash, yet allow dissolution in a less alkaline rinse. Optionally, a hydrophobic cationic species is included to further reduce the dissolution rate in the wash pH. The films remain intact during normal wash cycles and over a range of typical water temperatures, then rapidly dissolve in the rinse. The film can be used to microencapsulate an additive, or made into a water-soluble pouch, or as a soluble seal for a pouch or container.

14 Claims, 1 Drawing Sheet

RINSE SOLUBLE POLYMER FILM COMPOSITION FOR WASH ADDITIVES

This is a division of application Ser. No. 030,196, filed Mar. 24, 1987, now U.S. Pat. No. 4,801,636, dated Jan. 31, 1989.

BACKGROUND OF THE INVENTION

1. Field of the Invention

The present invention relates to water-soluble polymeric materials for use with wash additives, and more particularly to water-soluble polymeric films for rinse-release of wash additives.

2. Description of the Prior Art

Water-soluble polymeric films are known in the art and described in several references. Such polymeric films are used in packaging materials to simplify dispersing, pouring or dissolving the materials. As used herein "polymer" means a macromolecule made up of a plurality of chemical subunits (monomers). The monomers may be identical or chemically similar, or may be of several different types. Unless a more specific term is used, "polymer" will be taken to include hetero- and homo- polymers, and random, alternating, block and graft copolymers. Water-soluble, film packages of such polymeric materials can be directly added to the mixing vessel, advantageously avoiding contact with toxic or messy materials, and allowing accurate formulation in the mixing vessel. Soluble pre-measured polymeric film pouches aid convenience of consumer use in a variety of applications, particularly those involving wash additives. The use of polyvinyl alcohol (PVA) films to contain laundry products is hampered by the range of wash temperatures typically employed. PVA films of the art general exhibit their greatest solubility in hot water (above 90° F.) with varying degrees of solubility in warm (75° F.) and cold (40° F.) water. As used hereinafter, wash additive refers to those materials which are intended for use, or are most efficacious in a rinse portion of a wash cycle and are intended to improve the aesthetics, feel, appearance, sanitation or cleanliness of fabrics or wares washed in machine washing apparatus. Such wash additives are preferably rinse-added after an alkaline detergent wash has occurred, and include but are not limited to fabric softeners, brighteners, anti-redeposition agents and bleaches. It is desirable to effectuate the release of the additives during the rinse portion, rather than during the wash portion, of the wash cycle. It is further desirable to add these products initially, at the start of the wash cycle, thereby avoiding the need to monitor the cleaning process and add the additives at the beginning of the rinse portion of the wash cycle. Polymeric films used to contain such additives would have to be insoluble during the wash phase, remain insoluble throughout cold, warm, or hot water washes, and become soluble during the rinse phase.

U.S. Pat. No. 4,626,372, issued to Kaufmann et al discloses a PVA film soluble in wash liquors containing borate. Richardson et al. U.S. Pat. No. 4,115,292 shows enzymes embedded in water-soluble PVA strips, which are in turn encased in a water-soluble polymeric film pouch which may be PVA. The PVA may include cellulose as a modifier. Albert, U.S. Pat. No. 3,892,905 discloses a cold-water soluble film which may be useful in packaging detergents. British patent application No. 2,090,603 (Sonenstein) describes a packaging film having both hot and cold water solubility and formed from a blend of polyvinyl alcohol and polyacrylic acid. Haq, U.S. Pat. No. 4,416,791 describes a detergent delivery pouch of a water-soluble PVA layer and a water-insoluble polytetrafluoroethylene layer which encloses a liquid additive. U.S. Pat. No. 4,234,442 issued to Cornelissens discloses a dual package pouch delivering an acidic detergent component and an alkaline detergent component. The pouch is composed of a mixture of different water-soluble polymers. Wong, U.S. Pat. No. 4,108,600 shows a detergent composition in a water-insoluble pouch which is encapsulated with material having a pH dependent solubility to achieve a pH dependent release. Dunlap, U.S. Pat. No. 3,198,170, shows a cold-water soluble detergent packet of PVA containing a granular detergent having a hydrated salt to maintain moisture in the film. Schultz et al U.S. Pat. No. 4,557,852 describes a copolymeric water-soluble film for packaging wash additives. The film comprises a water-insoluble "soft" monomer plus a water-soluble anionic monomer. Pracht et al, U.S. Pat. No. 4,082,678 describes an article for rinse-release of actives consisting of an outer pouch or container which has at least one water-soluble wall, of for example PVA, and an inner receptacle having at least one soluble wall of, for example, PVA or methylcellulose. The inner soluble wall is insolubilized during the wash by an electrolyte or pH control agent which may be sodium borate. Guerry et al, U.S. Pat. No. 4,176,079 describes a wash additive enclosed in a water-soluble polymer of e.g., PVA or methylcellulose. Zimmermann et al, U.S. Pat. No. 4,098,969 shows PVA with boric acid as a means of reducing the solubility of the PVA. Shinetsu, JP No. 54-137047 shows a film of a polyvinyl alcohol phosphate and a nonionic water-soluble cellulose such as methylcellulose.

Accordingly, there remains a need for a water-soluble delivery system for a wash additive, which will remain insoluble during hot, warm, or cold water wash conditions but will rapidly and fully solubilize during rinse conditions to release the wash additives.

It is therefore an object of the present invention to provide a pH dependent, temperature independent, water-soluble additive release means.

It is another object of the present invention to provide a means for delivery of wash additives, which means may be added during a wash portion of a wash cycle and which will deliver the wash additives during a rinse portion thereof.

DISCLOSURE OF THE INVENTION

In accordance with one embodiment of the present invention, a polymeric film article is provided which is useful for releasing a wash additive into a wash solution during a rinse portion of the cycle but not during a wash portion of the cycle. The film comprises a polyvinyl alcohol blended with an alkyl cellulose or a derivative thereof and is maintained in contact with a cross-linking agent, and optionally, a cationic species having a hydrophobic group, the resulting film having a low variation in solubility rate as a function of a wash temperature. The term film is used broadly herein to include micro-encapsulating film, (i.e., film coated onto a dry additive particle or a liquid droplet) as well as film utilized to provide macroenvelopes (i.e., a free standing film having a small thickness in relation to its area), and film in which a wash additive is uniformly dispersed.

In accordance with another embodiment of the present invention, a method is set out of adding a wash additive during a wash portion of a wash cycle, yet releasing the additive during a rinse portion of the cycle, substantially independently of the temperatures during the wash cycle. The method comprises substantially surrounding an additive with an amount of the polymeric film material, the amount being selected to remain substantially undissolved over a wash cycle temperature range from about 10° C. to about 70° C., yet rapidly dissolve in the rinse. By control of the ratio of PVA to alkyl cellulose, and by maintaining the cross-linking agent in contact with the polymeric material during an alkaline wash portion of the wash cycle, dissolution of the polymeric film material, and release of the additive over the wash portion of the wash cycle, is inhibited.

The invention provides a film having a controlled dissolution rate in water such that only a small portion dissolves within about ten minutes in an aqueous wash solution typically having a pH greater than about 9-10 and such that the material substantially dissolves within about five minutes in an aqueous rinse solution typically having a pH less than about 9-10. These properties are exhibited over temperatures between about 10° C. and about 70° C.

Operation in accordance with the present invention provides release of a wash additive, which is added during an initial or wash portion of the wash cycle, during a later or rinse portion of the wash cycle. This is accomplished independently of the wash and rinse temperatures.

IN THE DRAWINGS

BEST MODE FOR CARRYING OUT THE INVENTION

Figure 1:
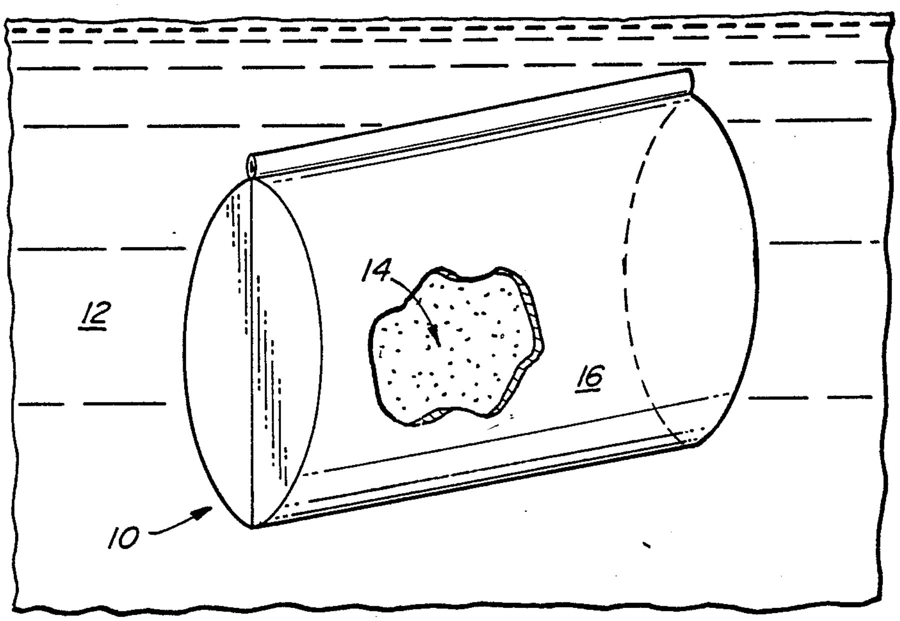
FIG. 1 illustrates one embodiment of the present invention wherein a wash additive is enclosed within a polymeric film envelope.

The polymeric film material of the present invention is selected to be substantially insoluble during the wash portion of a wash cycle, yet to be relatively quickly soluble during the rinse portion of that cycle wherein it is substantially dissolved. Also, the film is selected so that the temperatures during the wash portion and the rinse portion do not so affect the dissolution rate of the polymeric material to cause it to either dissolve during the wash portion of the cycle or to not dissolve during the rinse portion of the cycle. It has been surprisingly found that a mixture of a polyvinyl alcohol and an alkyl cellulose can be used to make a polymeric film which has very little variation in solubility as a function of temperature of an aqueous liquid to which it is exposed over the range from about 10° C. to about 70° C., which temperature range covers both the normal clothes wash operation temperature range, generally from about 10° C. to about 60° C., and the somewhat higher temperatures, up to about 70° C., sometimes utilized in dishwashing apparatus. The term polyvinyl alcohol as used herein means polyvinyl alcohol itself, derivatives thereof, and its water-soluble copolymers. The polyvinyl alcohol resins described herein are generally produced by the hydrolysis of polyvinyl acetate and generally have a degree of hydrolysis between about 70% and about 98%, preferably between about 80%-90%. The weight average molecular weight of the PVA will generally be at least about 10,000 and will normally not be less than about 49,000 g/mole. The upper limit of the PVA molecular weight may be 125,000 g/mole or more. A range of weight average molecular weights for the alkyl cellulose may be from about 10,000 g/mole to 115,000 g/mole or higher, depending on availability. As used herein the term alkyl cellulose includes cellulose in which an average of between about 1.1 and about 2.5 of the available hydroxy groups on each glucoside unit have been converted to alkyl ethers. The term alkyl is used to include, usually, lower alkyl groups having no more than about 8 carbon atoms and which may contain hydroxyl or other functional groups. Mixtures of various alkyl cellulose compounds and/or derivatives are likewise useful. It is preferred that the alkyl group of the alkyl cellulose be primarily methyl. It is also preferred that the alkyl group be hydroxypropyl or hydroxybutyl, in combination with methyl. An especially useful alkyl cellulose is hydroxybutylmethylcellulose (HBMC). This polymer provides the added benefit of aiding release of oily soils when used in combination with a detergent additive. All of the foregoing alkyl celluloses may be collectively referred to as MC. Generally, a weight ratio of polyvinyl alcohol to alkyl cellulose will fall within a range from about 1:5 to about 5:1. More preferred is a ratio of 1:3 to 4:1. A particularly good composition is a mixture of about 30 parts by weight PVA which has about 3 parts by weight cross-linking agent dispersed therein, and about 70 parts by weight MC. Such a film, in a relatively high pH wash solution, for example a pH above about ten, is only very slowly soluble and a one mil thick film made therefrom does not substantially dissolve during the wash portion of a wash cycle. The one mil thick film is rapidly soluble during the rinse portion of the wash cycle, however, thus providing the desired release of the wash additive surrounded thereby. While a film thickness of about one mil is generally optimal, depending on wash conditions, PVA to MC ratio, type and amount of cross-linking agent and additive, a preferred film thickness is from about 0.5 mils to about 5.0 mils.

In order to form the films of the present invention it is desirable to include a plasticizer with the polymeric resins. Virtually any plasticizers known in the art for use with the resins are suitable. Such plasticizers include, for example, water, glycerol, polyethylene glycol, and trimethylolpropane. Amounts of plasticizer added are sufficient to plasticize as is known in the art, and typically will range from about 0% to 30%. Optionally, ingredients such as surfactants can be added, for example, to aid in film production and wetting. Film production may be any means known in the art, e.g., by casting, extrusion or blow molding.

As is known, the pH during the wash portion of a wash cycle is usually higher than the pH during the rinse portion of that cycle. As is also known, compounds which produce borate anions are often used during the wash portion of a wash cycle. For example, various perborate bleaches may be added along with a detergent at the start of a wash cycle. This leads to bleaching action on any clothes being washed and also provides, incidentally, a relatively high borate anion concentration in solution. During the rinse portion of the wash cycle, the borate anion concentration, along with the pH of the aqueous wash liquid in contact with the clothing, is significantly lower.

In the present invention, sufficient of a cross-linking agent, comprising a metalloid oxide or other metal containing anion which has two or more oxygen ligands which are available and have the capacity to react or complex with hydroxy groups, is maintained in contact with the polymeric film material during the initial or wash portion of the wash cycle to significantly retard the dissolution of the polymeric material and the release of the wash additive surrounded thereby over the course of the initial or wash portion of the wash cycle. This may be effected by adding the cross-linking agent to the wash solution, by incorporating it with the PVA, or both. Preferred as the cross-linking agent is a metalloid oxide such as borate, tellurate, arsenate, and precursors thereof. Derivatized metalloid oxides, having, for example, attached phenyl groups, exemplified by benzene boronate, may also be suitable. The pH maintained in the wash portion of the wash cycle must be sufficiently high to permit cross-linking of the PVA by the cross-linking agent, generally above about 9, and more preferably above about 10. This pH usually results from the alkalinity inherently present in the detergent composition used for the wash. In some circumstances, however, as when a low pH detergent is used, the wash pH must be raised sufficiently to allow the cross-linking to occur. This can be done by adding any pH raising agent as known in the art, preferably by adding sodium carbonate. It is preferred that such addition be made to the wash liquid, although it may also be incorporated into the polymeric film article. Where the cross-linking agent is incorporated directly into the film, the wash solution pH should be above at least about 9.5, preferably above about 10. The rinse solution pH for such a film should be below about 9.5, preferably below about 9. Levels of cross-linking agent, if incorporated into the film, should be at least about 0.5 wt. %, more preferably about 3–5 wt. %. Up to about 15 wt. % cross-linking agent can be incorporated into the film and provides slower solubility in the wash portion of the wash cycle. Preferably, boric acid is the cross-linking agent. If the cross-linking agent is added to the wash solution, the wash solution pH should be above about 9, preferably above about 10, and the corresponding rinse solution pH should be below about 10, preferably below about 9. If the cross-linking agent is included in the wash solution, e.g. by adding it to the wash solution during the wash portion of the wash cycle, the concentration thereof must be at least about five ppm and more preferably at least about ten ppm. In the rinse, the cross-linking agent concentration should be no more than about 1.5 ppm, and more preferably no more than about 1 ppm.

Combinations of the foregoing may also be employed, i.e., the cross-linking may be incorporated into the film and added to the wash. In such case, levels of cross-linking agent at the lower end of the ranges for use in the film and for addition to the wash will suffice.

Adverting briefly to FIG. 1, an article of manufacture, comprising an envelope 10, in accordance with the invention is shown in a wash solution 12. A wash additive 14 is shown, in comminuted form, within the envelope 10. The envelope 10 is made of a polymeric film material 16 as disclosed herein. Any means known in the art for forming a film material into an envelope may be used to form the envelope 10.

Figure 2:
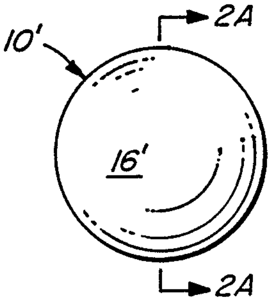
FIGS. 2-2A illustrate an alternative embodiment of the present invention wherein the wash additive is encapsulated within the polymeric film.
Figure 2A:
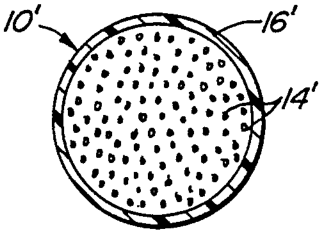

FIGS. 2–2A show an alternate embodiment of the invention, namely, an embodiment where a plurality of articles of manufacture 10', in the form of microcapsules of polymeric material 16', enclose a comminuted wash additive 14'.

Figure 3:
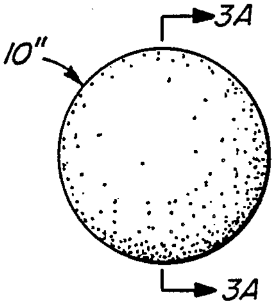
FIGS. 3-3A illustrate an alternative embodiment of the present invention wherein the wash additive is generally uniformly dispersed throughout the polymeric film.
Figure 3A:
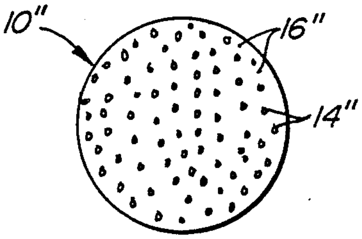

FIGS. 3–3A show yet another embodiment of the present invention, wherein the comminuted wash additive 14' is uniformly dispersed in a matrix of the polymeric material 16'' to form one or more of the articles of manufacture 10''. It should be noted that the articles of manufacture 10'', although shown as spheres, can be any convenient shape, for example, flat sheets. It is also within the scope of the present invention to use the polymeric film material 16 as an adhesive seal for an insoluble additive pouch (not shown), or as a water-soluble film wall for an insoluble container (not shown).

In another embodiment of the present invention, a cationic species having a hydrophobic group is maintained in contact with the polymeric material and cross-linking agent. As with the cross-linking agent, the cationic species may be present in the aqueous wash liquid, or can be added to the film or additive materials. Such cationic species may comprise organonitrogen salts, organophosphorous salts, cationic organic sulphonium salts, cationic organic tin compounds, amphoteric surfactants, and the like. The organic groups of such salts may be alkyl, aryl, alkenyl or combinations thereof. Quaternary ammonium compounds are the preferred cationic species. It has been found, for example, that when cetyl pyridinium chloride is present in the wash liquid at a concentration of 0.1 wt. %, the dissolution rates of polyvinyl alcohol/ alkyl cellulose films decrease by approximately thirty-two fold in the presence of borate ion in high pH liquids such as wash water, while the rates decrease only about three-fold in the lower borate ion concentration and lower pH rinse water. Similar results are obtained when small amounts of cetyl pyridinium chloride are incorporated in, or encapsulated within, the PVA/MC films instead of being added to the aqueous wash liquid during the wash portion of the wash cycle. Other water-soluble but hydrophobic cationic compounds, and particularly other quaternary nitrogen compounds, affect dissolution rates of such films in a similar manner. It is believed that such cationic compounds stabilize the insoluble complexes which form between the metalloid oxide, such as borate, present in the film, or in the wash environment, and the polyvinyl alcohol. The cationic species, like the cross-linking agent, may be incorporated into the film, added to the wash solution, or both. In the film, the cationic species may be added at levels of 0% to about 5% by weight, preferably about 0% to 2% by weight. Levels in the wash solution may be 0% to 1% by weight, preferably 0% to 0.5% by weight. Lower levels are used if added to both the film and the wash solution, and levels of cross-linking agent may be reduced in the presence of the cationic species.

The wash additive which may be substantially surrounded by the polymeric material may be of any desired nature. For example, in the case of clothes washing it may be a brightener, an antistatic agent, or a fabric softener and in the case of dishwashing, an antispotting agent, a perfume, or the like. In some instances, particularly wherein the wash additive is a fabric softening agent, it may likewise serve to modify the dissolution rate of the Polymeric material. For example, a number of fabric softeners are hydrophobic cationic nitrogen compounds. In such an instance, the wash additive itself serves to aid in slowing the rate of dissolution of the polymeric film materials of the present invention. It should be noted that anionic and nonionic surfactants, or the like, of the type typically employed as wash additives, do not significantly affect the dissolution rates of the polymeric films in more and less basic aqueous liquids.

One particularly useful embodiment is a mixture of a perborate bleach with the films of the present invention. In this embodiment the additive would be microencapsulated within, or dispersed throughout a matrix of, the polymeric material. The perborate bleach includes, generally, sodium carbonate along with sodium perborate, and would dissolve in the wash portion of the wash cycle, raising the pH and providing borate anions. As a result, the aqueous liquid present during the wash portion of the wash cycle is at a relatively high pH and has a significant borate anion concentration, which, as previously described, significantly retard film dissolution and prevent release of the additive during the wash portion of the wash cycle. During the rinse portion of the wash cycle, the pH drops markedly and the borate concentration is very significantly reduced, solubilizing the polymeric material and releasing the additive. The temperature independence of the rate of dissolution of the film is adjusted by varying the ratio of polyvinyl alcohol to alkyl cellulose. Thus, a useful wash product comprises a perborate bleach which includes a pH-adjusting agent such as sodium carbonate and which also includes an article of manufacture as described above, in microencapsulated form, or with the laundry additive dispersed in a matrix of the polymeric film material. The user of such a product simply measures out an appropriate quantity of the mixture into a cup or other measuring device and then adds it to the wash cycle during its initial portion. The wash additive is then released, generally, during the rinse portion of the wash cycle. The perborate bleach may be further enhanced by including a perborate activator to generate peracids, as is known in the art. Such an activator may be tetraacetylethylenediamine (TAED) or acylated phenol sulfonate esters as exemplified by GB No. 864,798, the disclosure of which is incorporated by reference.

Preparation of PVA Films

The PVA solutions were prepared by vigorously stirring distilled water at room temperature and slowly adding PVA resin granules to prevent agglomeration. After all of the PVA had dispersed, the mixture was heated slowly to 55-60° C. and the stirring was continued until all of the PVA had dissolved. The solution was cooled and stirred very slowly until the entrapped air had escaped.

Mixed PVA/MC solutions were prepared by first dissolving PVA granules in hot distilled water and then adding MC resin while the solution was hot. Various additives were generally added after the PVA and MC had dissolved. Plasticizers and surfactants were sometimes added before the PVA as none of these substances interact with PVA or MC in solution, and appeared to aid in the dissolution of the resins. Boric acid was added as a solution of one gram of boric acid in 20 ml of distilled water dropwise to a vigorously stirred solution of dissolved PVA. After the addition, the solution was stirred for at least one hour. Stirring was increased for more viscous solutions in order to insure homogeneity.

PVA/MC films were cast on clear seamed plate glass using a square multiple clearance film applicator which had a four inch wide film opening. The applicators were obtained from the Gardner Laboratory Division of Pacific Scientific. The glass plates supporting the freshly cast films were completely dried at room temperature on a level surface. Some films were dried at 37.8° C. to speed up drying. These films were allowed to equilibrate for several hours at room temperature before they were removed from the glass plates.

The PVA/MC films were hazy and colorless and only the surfaces of the films which were in contact with the glass plate were smooth.

Dissolution Testinq of PVA and PVA/MC Films

Dissolution testing was carried out in a 1 L beaker containing about 750 ml of wash or rinse medium. For each test, a piece of PVA/MC film was weighed, submersed in the medium, stirred, and the time for the film to visually dissolve was determined using a stopwatch.

Occasionally, the stirring was interrupted and the film was dried, cooled, and weighed to determine the amount of dissolution. A similar procedure was used to determine the amount of water in a piece of film that had not been exposed to the dissolution medium. In order to test rinse dissolution, the film was stirred in the wash solution for 10 minutes. The stirring was stopped and the film was transferred with forceps to a stirred rinse solution.

A simulated wash solution was prepared by dissolving 1.1 g of $Na_2CO_3$ and 0.12 g of borax in 750 g of deionized water. Sufficient $NaHCO_3$ was added to adjust the pH between 10.56 and 10.58 at 23° C. This usually required about 0.19 g of $NaHCO_3$, depending on the quality of the deionized water. A rinse solution was prepared by adjusting the pH of deionized water between 9.39 and 9.41 using $Na_2CO_3$ and $NaHCO_3$.

The effects of surfactants on the dissolution of PVA films were determined by including 0.75 g (0.1%) of the surfactant in the wash or rinse medium. With the exception of tetraethylammonium hydroxide the surfactants were used as supplied. The pH of the wash solution containing tetraethylammonium hydroxide was adjusted to 10.57 using HCl.

The invention will be better understood by reference to the following illustrative examples. Unless indicated otherwise all films included 88% hydrolyzed PVA, and no cross-linking agent in the film.

EXAMPLE 1

Effect of Borate Concentration and pH On Polyvinyl Alcohol Dissolution

The percent dissolution of a 1.5 mil thick polyvinyl alcohol film (QUICKSOL A, a trademark of Polymer Films Co.) and with an average molecular weight of 96,000 g/mole, and which contained about 18 wt.% of a plasticizer (polyethylene glycol) and about 4% of water was determined in solutions having pH's of 10.8, 9.8, and 8.6 with borate concentrations in the wash solution of $3.4\times10^{-3}$, $1.7\times10^{-3}$, $0.8\times10^{-3}$ and 0. Table 1 summarizes the results of this testing.

TABLE 1

| Percent of PVA Film Undissolved After a Five Minute Wash at 24° C. | | | |
|---|---|---|---|
| Borate Concentration × $10^{3M}$ | Percent Undissolved PVA | | |
| | pH 10.8 | pH 9.8 | pH 8.6 |
| 3.4 | 75 | 79 | 8 |
| 1.7 | 73 | 70 | 0 |
| 0.8 | * | 15 | 0 |
| 0 | 2 | 2 | 0 |

*Could not be determined due to film break-up into small pieces.

As the table above illustrates, the presence of borate at alkaline pH leads to a reduction in the dissolution rate of polyvinyl alcohol films. On the other hand, when the pH is relatively low (8.6) the dissolution rate is relatively fast. When no borate is present dissolution of the film is nearly complete after five minutes at each pH listed. This shows the necessity for the presence of the cross-linking agent and an alkaline pH. For comparison, the pH and borate concentrations which occur when a perborate/carbonate dry bleach, (CLOROX 2, a registered trademark of The Clorox Company), is added in accordance with carton instructions to a clothes wash cycle are pH 10.6 and $1.7\times10^{-3}$M borate. This is well within the desired parameters of operability of the invention.

EXAMPLE 2

Effect of Temperature on the Dissolution of 125,000 g/mole Molecular Weight PVA Films in Perborate/Carbonate Wash Solutions The change in breakup/dissolution time for 125,000 molecular weight PVA films (88% hydrolyzed, no borate) in perborate/carbonate wash solutions was measured. Table 2 below summarizes the results obtained with a 0.9 mil thick film and a 1.4 mil thick film.

TABLE 2

| Effect of Temperature on the Dissolution of 125,000 Molecular Weight PVA Films in Wash Solutions[a] | | |
|---|---|---|
| Temperature (°C.) | Breakup/Dissolution Time (sec) | |
| | 0.9 mil film | 1.4 mil film |
| 24 | c | c |
| 40 | 370/500 | c |
| 50 | 170/225 | 300/360 |
| 60 | 71/120 | [b]/350 |

[a]pH = 10.6, [borate] = $1.7\times10^{-3}$M.
[b]Film dissolved without breaking into smaller pieces.
[c]None observed within 10 min.

As will be seen from Table 2, the rate of breakup/dissolution is dependent upon the temperature of the wash solution. Breakup time for a 0.9 mil film varies from slightly over a minute at 60° C. to over 45 minutes at 24° C. Dissolution times are likewise affected. This example makes it clear that, in the absence of a proper choice of polymeric materials, enveloped, encapsulated, or dispersions of wash additive particles in the polymeric material, will dissolve at too great a speed in the wash solution at higher temperatures to be useful for all choices of wash and rinse temperatures.

EXAMPLE 3

Effect of Molecular Weight and Film Thickness on the Dissolution of PVA Films As can be seen from Table 3, a decrease in dissolution rate caused by an increase in molecular weight of the PVA can be compensated for, in part, by reducing the thickness of the film.

TABLE 3

| Effect Of Molecular Weight And Film Thickness On The Dissolution Of PVA Films | | | |
|---|---|---|---|
| Molecular Weight (g/mole) | Thickness (mils) | 24° C. Rinse[a,b] Dissolution Time (sec) | 50° C., 10 min Wash[b] Dissolution Time (sec) |
| 125,000 | 1.1 | 170 | 360 |
| | 1.4 | 320 | 360 |
| | 1.6 | 360 | c |
| 96,000 | 1.5 | 160 | — |
| | 2.0 | 400 | 360 |
| 78,000 | 2.0 | 280 | 350 |
| | 2.3 | 405 | 350 |

[a]Follows a 10 minute perborate/carbonate wash at 24° C.
[b]Wash: pH = 10.6, [borate] in wash solution = $1.7\times10^{-3}$M; Rinse: pH = 9.4, no detergent.
[c]None observed within 10 min.

EXAMPLE 4

Effect of Surfactant in a Perborate/Carbonate Wash on Rinse Dissolution of PVA Film The dissolution time of a PVA film during the rinse following a 10 minute wash with the wash water having a PH of 10.6, a borate concentration of $1.7\times10^{-3}$M, and 0.1 wt.% of a surfactant at a temperature of 24° C., was measured. The rinse was at a pH of 9.4 and also at 24° C. The results of these tests are set out in Table 4.

TABLE 4

| Effect of 0.1 wt. % of a Surfactant in Perborate/Carbonate Wash on the Rinse Dissolution of a 125,000 Molecular Weight PVA Film | | |
|---|---|---|
| Surfactant | Film Thickness (mils) | Rinse Dissolution (sec) |
| None | 1.2 | 215 |
| Alkylbenzene sulfonate[a] | 1.2 | 130 |
| Ethoxylated linear alkyl alcohol[b] | 1.3 | 210 |
| Tetraethylammonium Chloride | 1.3 | 260 |
| Dodecyltrimethylammonium Bromide | 1.2 | 330 |
| Didodecyldimethylammonium Bromide | 1.3 | 560 |
| Hexadecyltrimethylammonium Bromide | 1.2 | 680 |
| Hexadecylpyridinium Chloride | 1.3 | 730 |
| Dimethyldioctadecylammonium Bromide | 1.3 | 251 |

[a]CALSOFT L-40, a trademark of Pilot Chemical Company
[b]NEODOL 25-7, a trademark of Shell Chemical Company The data show that depending on the surfactant, the rinse dissolution times can be increased, decreased, or remain unaffected. Note that while the data presented is based on a PVA film, PVA/MC films exhibit substantially identical dissolution effects. Surfactants in the nature of cationic species with hydrophobic groups can greatly increase dissolution time, as previously discussed.

In a separate experiment the time required for a 1.2 mil thick PVA film with a molecular weight of 125,000 g/mole to break apart in a 50° C. wash having a pH of 10.6 and a borate concentration of $1.7\times10^{-3}$M, was measured as 285 seconds in the absence of hexadecylpyridinium chloride and 9,200 seconds in the presence of hexadecylpyridinium chloride (0.1% in the wash solution). While the rinse dissolution time increases only by a factor of about 3.5, the wash dissolution time increases by a factor of about 32 (9200 divided by 285). Thus, the solubility rate of a PVA film is decreased to a much greater extent in a hot water, borate wash, than in a cold water (24° C.) rinse, by the presence of the hexadecylpyridinium ion.

Without limiting to any particular theory, it is hypothesized that the water-soluble quaternary nitrogen compounds act as counter-ions for the negatively charged PVA-borate complex. It has also been noted that the rate of solution of these complexes decreases as the hydrophobicity of the quaternary nitrogen comPounds increases. The inclusion of quaternary nitrogen compounds tends to increase the desired solubility characteristics for rinse-release over a wide temperature range. Certain of the quaternary nitrogen compounds also serve as fabric softeners. These can serve a dual purpose when they form a part of the article of manufacture of the present invention.

EXAMPLE 5

Effect of Adding Alkyl Cellulose on Film Solubility

The effects of utilizing different proportions of PVA and MC (methylcellulose) or hydroxybutyl methylcellulose (HBMC) in cast films, of varying the molecular weights of each of the materials, and of incorporating boric acid and cetyl pyridinium chloride into the films, on solubility of the resulting films at 24° C., 40° C. and 50° C., was measured. Tables 5 and 6 summarize the data.

TABLE 5

| Number Average Molecular Weight (g/mole) | | | Wt. % Boric | | Dissolution Time (Sec.) | | |
|---|---|---|---|---|---|---|---|
| PVA | MC | PVA/MC | Acid in Film* | Thickness (mil) | 24° C. Rinse | 40° C. Rinse[a,b] | 50° C. Wash[b] |
| 78000 | 14000 | 3:2 | 0 | 4.4 | 170 | | 415 |
| 78000 | 14000 | 3:7 | 0 | 4.1 | 90 | | 200 |
| 78000 | 41000 | 3:2 | 0 | 2.2 | 125 | | 200 |
| 78000 | 41000 | 3:2 | 0 | 4.2 | 160 | | 730 |
| 78000 | 41000 | 3:2 | 3 | 4.1 | 226 | | 815 |
| 78000 | 41000 | 3:7 | 3 | 1.8 | 65 | | >1660 |
| 78000 | 41000 | 3:7 | 0 | 3.6 | 285 | | >2160 |
| 78000 | 41000 | 3:7 | 3 | 3.8 | >600 | | >1930 |
| 125000 | 14000 | 3:2 | 0 | 2.0 | 140 | | 170 |
| 125000 | 14000 | 3:2 | 0 | 4.0 | 200 | 30 | 440 |
| 125000 | 14000 | 3:7 | 0 | 4.1 | 130 | | 520 |
| 125000 | 14000 | 3:7 | 3 | 3.6 | 100 | | 398 |
| 125000 | 16500 | 2:3 | 0 | 2.6 | 80 | | 540 |
| 125000 | 41000 | 3:2 | 0 | 2.2 | 125 | | 265 |
| 125000 | 41000 | 3:2 | 3 | 1.8 | 210 | | 550 |
| 125000 | 41000 | 3:2 | 0 | 4.2 | 200 | 130 | 740 |
| 125000 | 41000 | 3:2 | 3 | 3.8 | 300 | | 845 |
| 125000 | 41000 | 3:7 | 0 | 1.7 | 80 | 240 | 1500 |
| 125000 | 41000 | 3:7 | 3 | 1.7 | 100 | | >2550 |
| 125000 | 41000 | 3:7 | 0 | 3.9 | 600 | | >1380 |

PVA = polyvinyl alcohol, 88% hydrolyzed
MC = methylcellulose
[a]Rinse followed 10 minute wash at the same temperature; Rinse pH = 9.4
[b]Wash solution included manufacturer's recommended amount of powdered detergent; [borate ion] = $1.7 \times 10^{-3}$M; pH = 10.6
*All films included 3 wt % polyethylene glycol; average MW of about 600 g/mole.

As may be noted from Table 5, increasing the ratio of methylcellulose to polyvinyl alcohol in a film decreases the solubility rate of the film in a hot water wash. As the weight percent of polyvinyl alcohol decreases, the solubility rate in cold and warm water increases, even in the presence of borate. As will also be noted, increasing the molecular weight of the methylcellulose decreases the solubility rate in hot water, and, to a lesser extent in cold water. The effect of methylcellulose molecular weight is greater in films which are comprised primarily of methylcellulose. Increasing the molecular weight of the polyvinyl alcohol decreases the solubility rate in a hot water wash, but to a lesser extent than increasing the molecular weight of the methylcellulose. Increasing the molecular weight of the polyvinyl alcohol also decreases the solubility rate in a cold and a warm water wash. The cold rinse dissolution time also increases by increasing the molecular weight of the polyvinyl alcohol.

Table 6 illustrates use of hydroxybutyl methylcellulose and the effect of the presence of a hydrophobic quaternary ammonium cation, namely, the cetyl pyridinium ion. The experiments reported in Table 6 demonstrate that hydroxybutyl methylcellulose, as well as methylcellulose, is useful along with polyvinyl alcohol in practicing the present invention. Note, in particular, rinse dissolution in less than 30 seconds at 24° C. along with wash non-dissolution in over 600 seconds at 50° C.

TABLE 6

| PVA/HBMC | Wt. % Boric Acid in Film[c] | Wt. % CPC in Film | Thickness (mils) | Dissolution Times (sec.) 24° C. Rinse[a] | 50° C. Wash[b] |
|---|---|---|---|---|---|
| 1:0 | 0 | 0 | 1.5 | 350 | 95 |
| 1:0 | 0.9 | 0.9 | 1.3 | d | d |
| 9:1 | 0 | 0 | 3.3 | — | 200 |
| 4:1 | 0 | 0 | 3.5 | 200 | d |
| 4:1 | 7.5 | 2 | 2.6 | 30 | d |

TABLE 6-continued

| PVA/HBMC | Wt. % Boric Acid in Film[c] | Wt. % CPC in Film | Thickness (mils) | Dissolution Times (sec.) 24° C. Rinse[a] | 50° C. Wash[b] |
|---|---|---|---|---|---|
| 3:2 | 0 | 0 | 3.8 | 600 | d |

PVA wt. average MW of about 96,000 g/mole
HBMC wt. average MW of about 115,000 g/mole
CPC = Cetylpyridinium chloride
[a]Rinse followed a 6–10 minute detergent wash at 24° C.; Rinse pH = 9.4
[b]Wash solution included manufacturers recommended amount of powdered detergent; [borate ion] = $1.7 \times 10^{-3}$M; pH = 10.6
[c]All films included 7.5% polyethylene glycol, avg MW of 200 g/mole
[d]None observed after 10 min.

The above examples have illustrated an article of manufacture utilizing a polymeric film material which substantially surrounds a wash additive and serves to release the additive during the rinse portion of a wash cycle while preventing dissolution of the additive during the preceding wash portion of the wash cycle. The polymeric film material can be formulated to remain intact in wash temperatures such as those typically encountered in fabric and ware washing, yet rapidly and fully solubilize in a rinse solution to release the additive.

While described in terms of the presently preferred embodiments, it is to be understood that such disclosure is not to be interpreted as limiting. Various modifications and alterations will no doubt occur to one skilled in the art after having read the above disclosure. Accordingly, it is intended that the appended claims be interpreted as covering all alterations and modifications as fall within the true spirit and scope of the invention.

What is claimed is:

1. An article of manufacture comprising
(a) a wash additive;
(b) a water-soluble polymeric film material substantially surrounding the additive, the film comprising a blend of polyvinyl alcohol, having a weight average molecular weight of at least about 10,000 g/mole and a degree of hydrolysis of between about 70–98%, with an alkyl cellulose having a weight average molecular weight of at least about 10,000 g/mole, a ratio of polyvinyl alcohol to alkyl cellulose being between about 1:5 to 5:1; and
(c) a cross-linking agent, present in an amount sufficient to substantially insolublize the film in a first solution yet allow the solubilization thereof in a second solution.

2. The article of claim 1 wherein
said first solution is a wash solution and said second solution is a rinse solution.

3. The article of claim 1 wherein
the alkyl group of the alkyl cellulose is primarily methyl.

4. The article of claim 1 wherein
the cross-linking agent is selected from the group consisting of boric acid, telluric acid, arsenic acid, precursors thereof, derivatives thereof and mixtures thereof.

5. The article of claim 1 wherein
the cross-linking agent is incorporated into the film blend.

6. The article of claim 1 wherein
the film is in the form of a pouch with a quantity of the additive sealed therein.

7. The article of claim 1 wherein
the film encapsulates the additive to form a plurality of microcapsules.

8. The article of claim 1 wherein
the additive is dispersed throughout the film.

9. A method of releasing a wash additive into a rinse portion of a wash cycle substantially independently of a wash and a rinse water temperature range, comprising
(a) surrounding an additive with a selected amount of a polymeric material comprising a blend of a polyvinyl alcohol having a weight average molecular weight of at least about 10,000 g/mole and a degree of hydrolysis between about 70 and 98%, and an alkyl cellulose having a weight average molecular weight of at least about 10,000 g/mole, a ratio of polyvinyl alcohol to alkyl cellulose being between about 1:5 and 5:1, the amount of polymeric material being selected to remain substantially insoluble in a wash solution yet rapidly solubilize in a rinse solution;
(b) adding the surrounded additive to a wash solution having a first pH, and maintaining a cross-linking agent in contact with the polymeric material substantially throughout at least a wash portion of said wash cycle, the cross-linking agent being present in an amount sufficient to insolubilize the polymeric material in said first pH but allow the solubilization thereof in a rinse solution having a second pH; and
(c) replacing said wash solution with said rinse solution wherein the polymeric material dissolves.

10. The method of claim 9 wherein
the alkyl cellulose is hydroxybutylmethylcellulose having a weight average molecular weight of between about 26,000 and 115,000 g/mole.

11. The method of claim 9 wherein
the cross-linking agent is selected from the group consisting of boric acid, telluric acid, arsenic acid, precursors thereof, derivatives thereof and mixtures thereof.

12. The method of claim 9 wherein
the cross-linking agent is present in the polymeric film material.

13. The method of claim 9 and further including
maintaining a hydrophobic cationic material in contact with the polymeric material in said wash solution.

14. The method of claim 9 wherein
said first pH is greater than about 9.5 and said second pH is less than about 9.5.

* * * * *